June 27, 1944.  H. M. BUZZA  2,352,165
POSITIONING INDEX FOR TURRET MACHINES
Filed Jan. 1, 1942
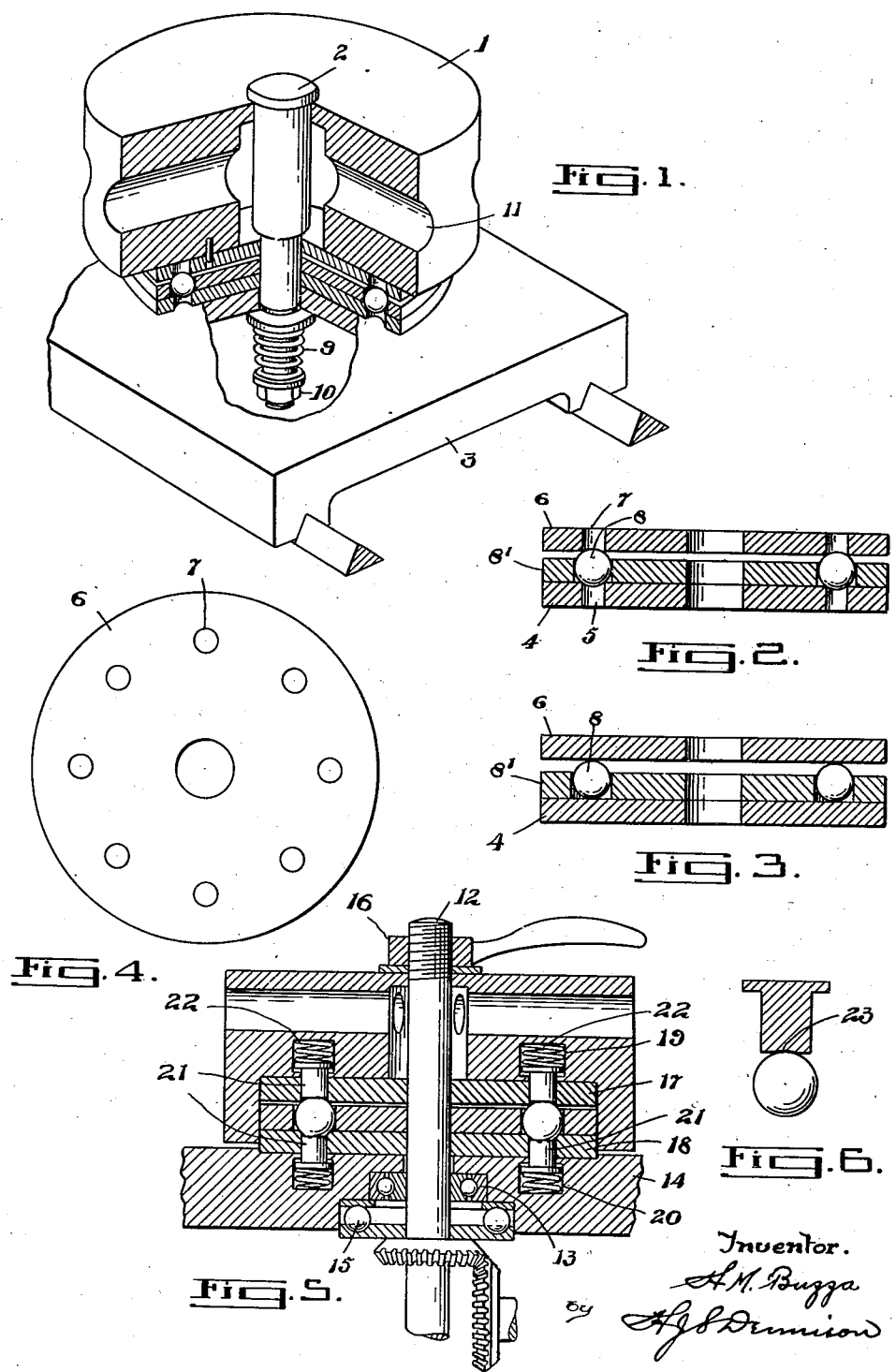

Patented June 27, 1944

2,352,165

UNITED STATES PATENT OFFICE 2,352,165

POSITIONING INDEX FOR TURRET MACHINES

Henry M. Buzza, Toronto, Ontario, Canada, assignor, by mesne assignments, to John G. Hames, Toronto, Ontario, Canada Application January 1, 1942, Serial No. 425,276

6 Claims. (Cl. 29—48)

The principal object of this invention is to ensure the accurate positioning of tool-carrying turrets in machines having turret tool holders which will operate automatically and will hold the turret firmly in the operating position.

Another and important object is to provide an index device in which wear will not impair its accuracy.

The principal feature of the invention consists in supporting the turret upon a plurality of ball bearings and providing the turret bed or bearing supporting surface with a plurality of equally positioned recesses adapted to individually receive and position said balls, the turret being adapted to ride upon said balls from one position to another.

In the accompanying drawing

Figure 1 is a part sectional perspective view of a turret mounted upon my improved positioning index.

Figure 2 is a vertical sectional view showing the indexing ball and socket members in positioning alignment.

Figure 3 is a sectional view of the indexing device with the balls displaced from the positioning sockets.

Figure 4 is a plan view of one of the socket positioning plates.

Figure 5 is a vertical sectional view of a modified form of the positioning index.

Figure 6 is an enlarged sectional view of one of the socket plungers and engaging balls shown in Figure 5.

In the ordinary construction of turret lathes it is the common practise to mount the rotatable turret upon a centre stud or boss and the turret is provided with a bolt which engages a socket opening in a bed or a positioning pin is arranged in the bed to engage socket holes in the turret and it is customary to operate this pin or bolt to withdraw it from the engaging socket prior to turning the turret from one position to another and the bolt is then released to engage the positioning socket.

It will be appreciated that continual use of a device of this nature will cause wear on both bolt and socket with the result that the turret cannot be positioned accurately so that the tools mounted therein will be brought into accurate positioning alignment with the work.

I have devised the present invention to overcome these inaccuracies and difficulties of operation and the means for overcoming same is extremely simple.

As illustrated in Figures 1 to 4, the turret head 1 is rotatably mounted upon a spindle 2 which is secured in the bed of the sliding tool carriage 3 of the machine. Arranged upon the bed of the carriage beneath the turret and centered upon the spindle 2 is a hardened steel plate 4 in which is bored a plurality of holes 5. These holes are preferably double the number to the number of tool sockets in the turret head.

A similar plate 6 provided with similarly spaced holes 7 is secured to the underside of the turret head.

Arranged between the plates 4 and 6 are a plurality of steel balls 8 corresponding in number with the number of holes in said plates. These balls are of larger diameter than the holes in said plates but will fit into and centre in the holes. A retaining plate 8' is arranged between the plates 4 and 6 and is provided with holes slightly larger than the full diameter of the balls. This plate holds the balls in position to align with the holes in the bearing plates.

The spindle as shown in Figure 1 is provided with a compression spring 9 on the end extending through the bed of the carriage 3, the tension of the spring being adjusted by means of a suitable nut 10 on the edge of the spindle.

When the turret is positioned so that one of its tool-holding sockets 11 is in alignment with the work, the steel balls rest in the sockets formed by the holes 5 and 7 and, as there are a plurality of these balls and corresponding sockets, the balls fitting into the several depressions or sockets will each seat itself as accurately as possible and even if some of the holes are not perfectly spaced the group of balls will find an average seating which, it will be understood, will render the positioning of the tool quite accurate.

It will be understood that the seating of a plurality of balls into the cylindrical pockets formed by the holes 5 and 7 will form a very positive holding medium as the spring 9 is a stiff compression spring and presses downwardly on the spindle and the head but the operator of a machine can readily displace the turret from the positioning influence of the balls by applying a rotating pressure to the tool head. When sufficient pressure is applied the plate 6 rides up upon the balls and the balls ride out of the holes 5 in the plate 4, the plates 4 and 6 spreading apart under the spring pressure to the position illustrated in Figure 3, that is, where the full diameter of the balls is accommodated between the plates and the balls roll on the flat hardened steel surfaces of the plates until brought to the next succeeding set of holes when the balls automatically drop into the holes and position the turret head securely.

It will be readily appreciated that any slight inaccuracy in any one hole will not effect the average positioning of the total number of holes.

In the form of the invention illustrated in Figure 5 the spindle 12 for supporting the turret head is preferably mounted in a ball bearing 13 arranged in the base plate 14 and a thrust bearing 15 is provided adjacent to the bearing 13. The upper end of the spindle is shown threaded and the clamp nut 16 is mounted thereon so that the operator may, by turning the clamp nut, loosen the head or tighten the same on the spindle.

The recessed underside of the turret head has secured therein a bearing plate 17 which is similar to the plate 6 and a bearing plate 18 is arranged on the base similar to the plate 4. Above the plate 17 and below the plate 18 are arranged recesses 19 and 20 respectively and in these recesses are housed the flanged head ends of a set of plungers 21 which are spring pressed to extend into the holes in the bearing plates 17 and 18 by coil compression springs 22 housed in the recesses.

Each of the plungers is provided in its end face with a very slight part spherical depression 23 which serves as a position feeling member to enable the operator to determine when the head is in the right position. When operating this type of positioning index the upper clamp nut 16 is released and the action of the springs 22 is to lift the head by pressing against the flanged plungers. When the plungers are extended fully outward by the compression springs merely the weight of the turret head rests upon the balls. Then the head may be turned either by hand or by means of an automatic turning mechanism which is not shown.

When the turret has been turned to a new position then the balls seat themselves in the small depressions 23 in the plungers 21. The operator then upon tightening the clamp nut 16 draws the head downwardly so that the balls cause the plungers to recede until the balls engage the perimeters of the holes in which the plungers slide, the balls thus firmly locking the head in the adjusted position.

It will be understood that other variations in the structure of the turret head may be devised without departing from the spirit of the present invention which is to utilize a plurality of steel balls in co-operation with a corresponding number of socket holes in the turret head and bed to effect the positioning of the turret head and to accurately hold it in the adjusted position.

What I claim as my invention is:

1. A positioning index for turret machines, comprising a member having a fixed bearing surface, a rotatable turret having a plane surface arranged parallel with said fixed surface and axially displaceable relative thereto, each of said surfaces having an equal number of equally spaced holes formed therein, ball bearings adapted to roll between said parallel surfaces and to enter said holes, means for guiding said balls into register with opposite holes in said parallel surfaces, and means for moving said turret axially toward said fixed surface with the balls engaging in the registering holes.

2. A positioning index for turret machines, comprising a bed plate having a plurality of holes therein equally spaced radially and equally spaced circumferentially, an axially movable bearing plate arranged in the turret having holes therein coinciding with the holes in the bed plate, steel bearing balls arranged to engage in oppositely coinciding holes in the bed and turret plates, means for holding said balls an equal distance apart, and means for applying pressure to the axially movable turret plate to hold said balls locked in their engaging positions in said holes.

3. In a turret machine, a bed plate, a turret rotatably mounted and spaced from and axially movable relative to said bed plate, holes bored in said turret in a circumferential row and equidistant from each other, holes bored in the bed plate in alignment with the holes in the turret, balls of greater diameter than the holes in said bed plate and turret arranged therebetween and adapted to seat in said holes, and spring pressure means connected with said turret for holding said turret and bed plate in close engaging contact with said balls and adapted to permit an axial movement of the turret in relation to the bed plate to release the balls from engagement with the said holes.

4. A positioning index for turret machines, comprising a turret having a circumferentially arranged row of holes, a bed plate having a circumferentially arranged row of holes adapted to align with the holes in said turret, spring plungers arranged in said holes in said bed plate and turret, ball bearings adapted to engage said plungers and to force said plungers inwardly to permit the engagement of the balls with the registering perimeters of the holes in the base plate and turret, and means for guiding the balls into alignment between said plungers.

5. A device as claimed in claim 4 in which the plungers are provided with flanged heads, recesses arranged in alignment with said holes in said turret and base receiving said flanged heads, coil compression springs arranged in said recesses, and means for pressing the turret downwardly to depress said plungers and to effect the interlocking of the balls with said base plate and said turret.

6. A device as claimed in claim 4 in which the plungers are each formed with a positioning recess in the ball-engaging end.

HENRY M. BUZZA.